Figure 1:
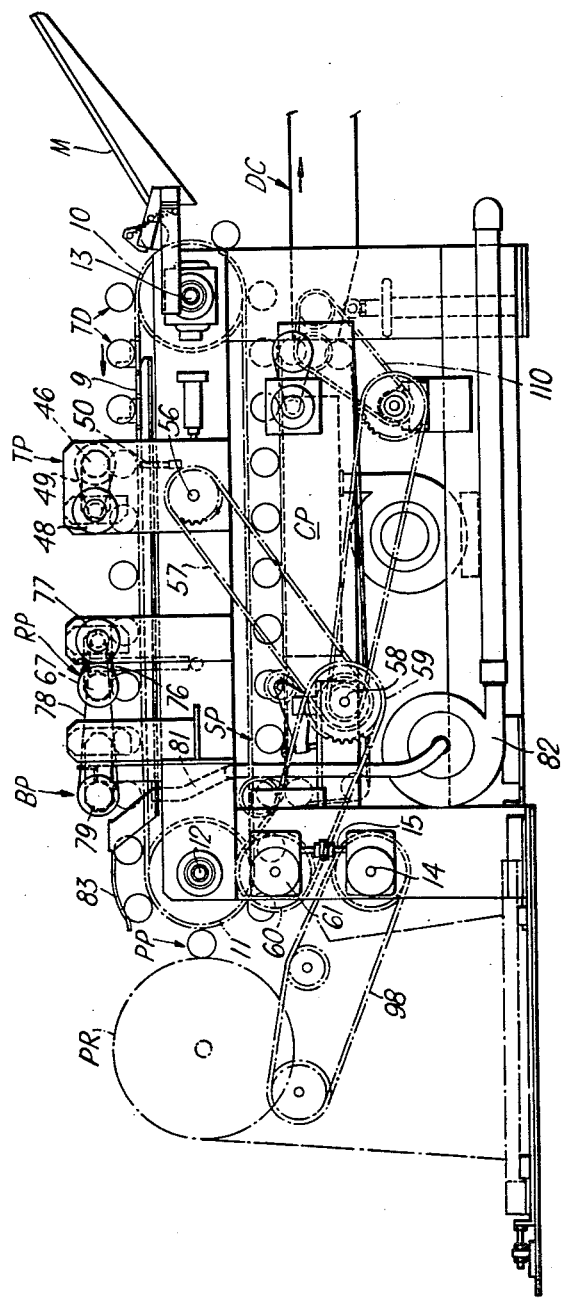

Dec. 3, 1963    H. COOKSON    3,112,692
DECORATING PLASTIC CONTAINERS
Filed May 2, 1961    14 Sheets-Sheet 1

Inventor
HAROLD COOKSON
By
Attorneys

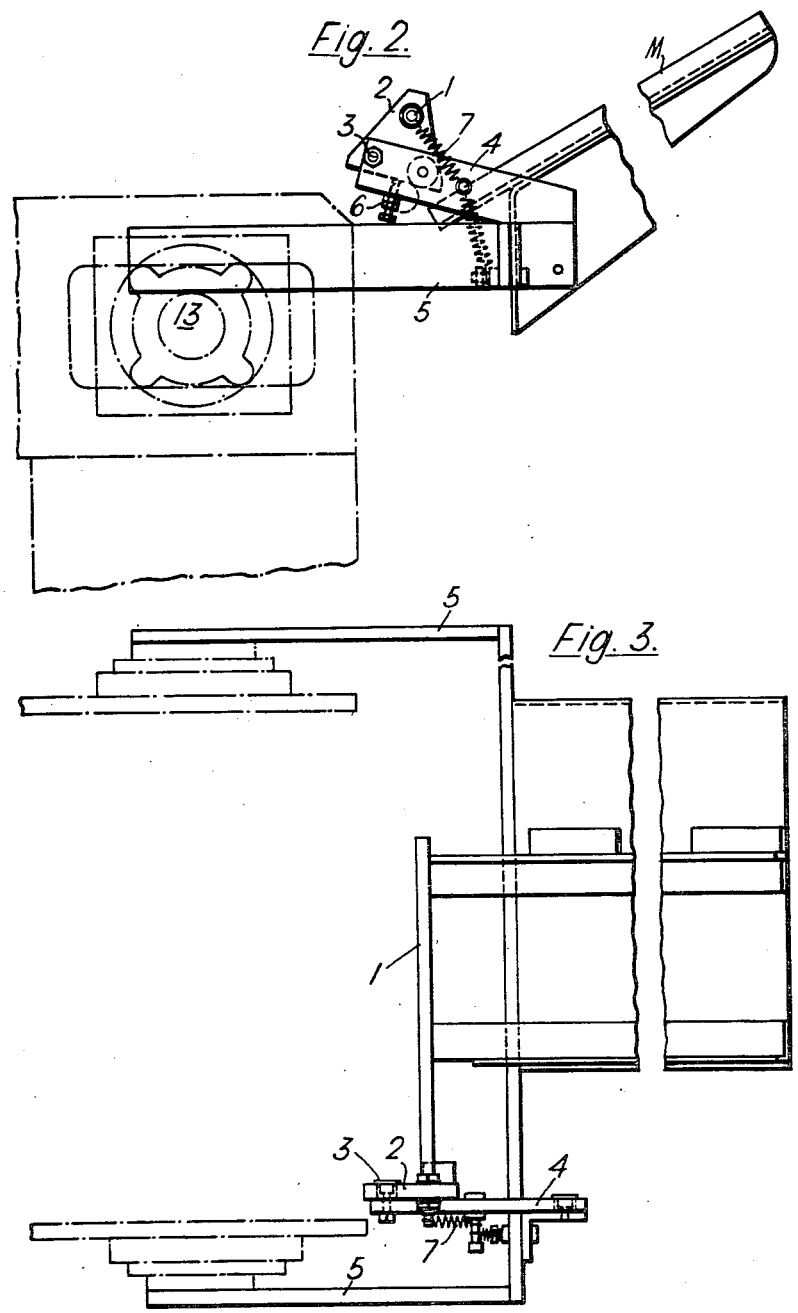

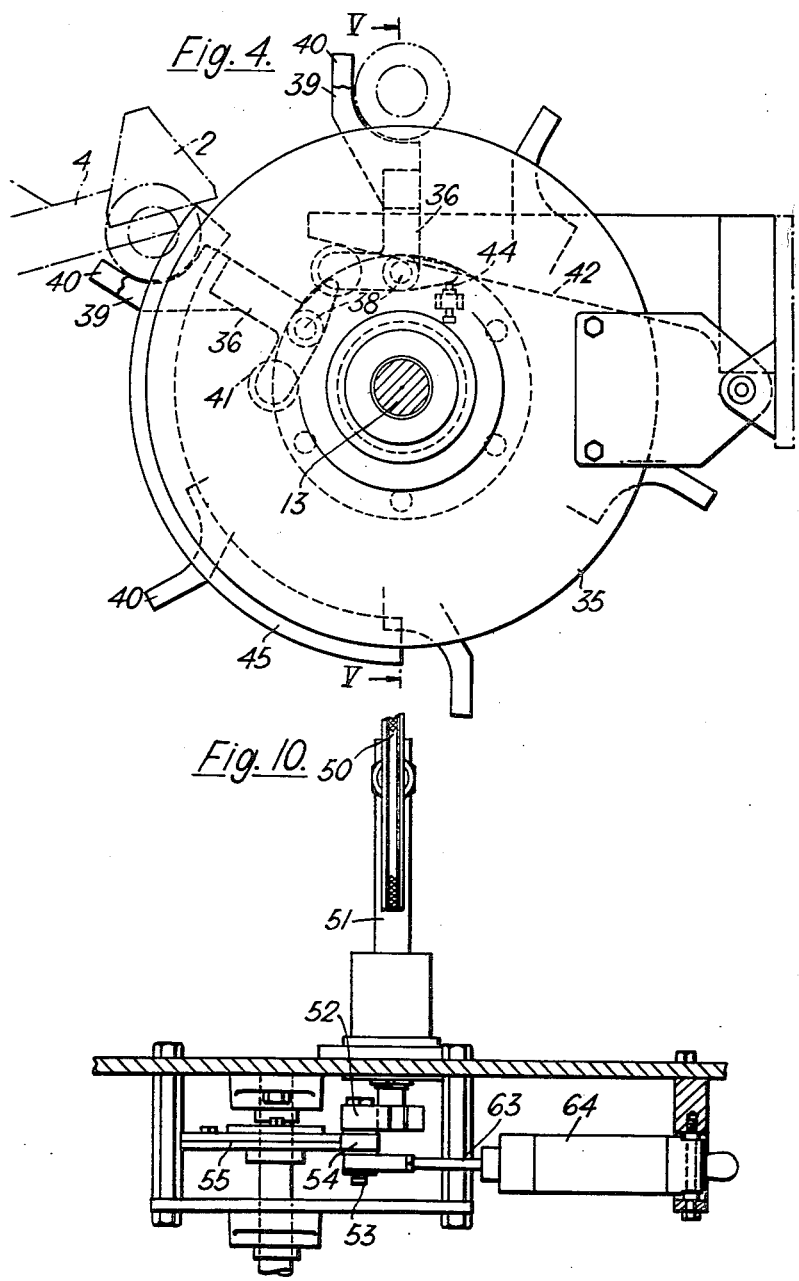

Inventor
HAROLD COOKSON

Dec. 3, 1963 H. COOKSON 3,112,692
DECORATING PLASTIC CONTAINERS
Filed May 2, 1961 14 Sheets-Sheet 5
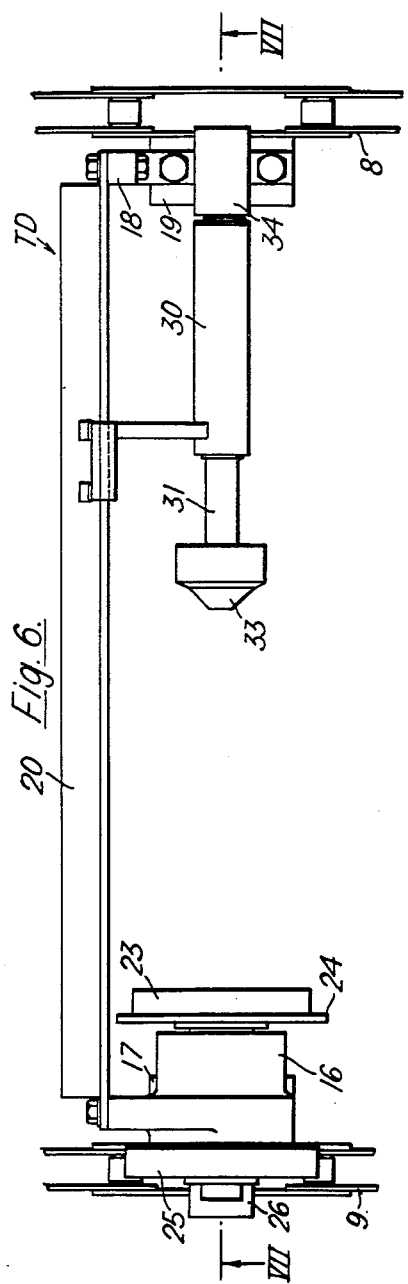
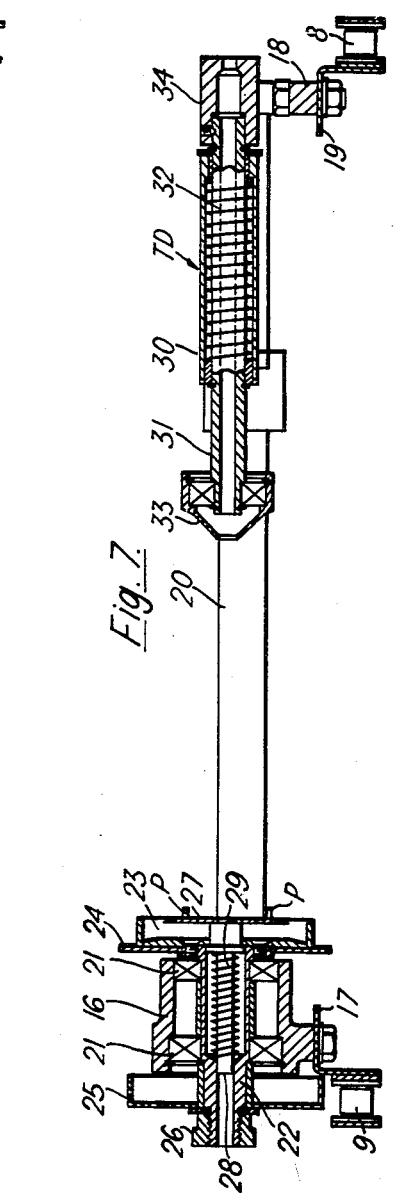
Inventor
HAROLD COOKSON
By *Imirie & Smiley*
Attorneys

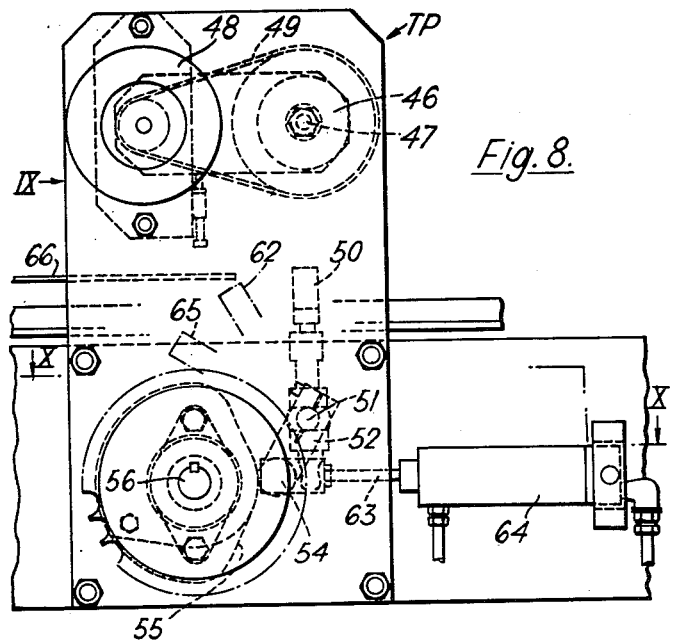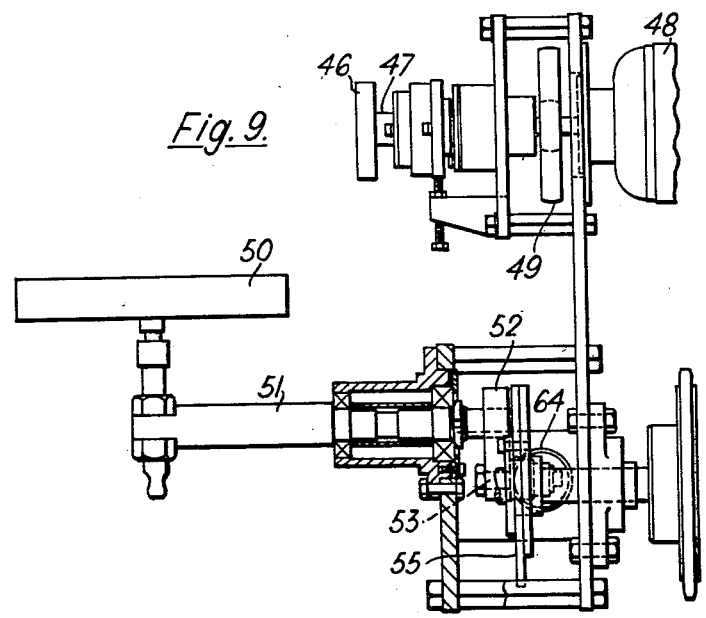

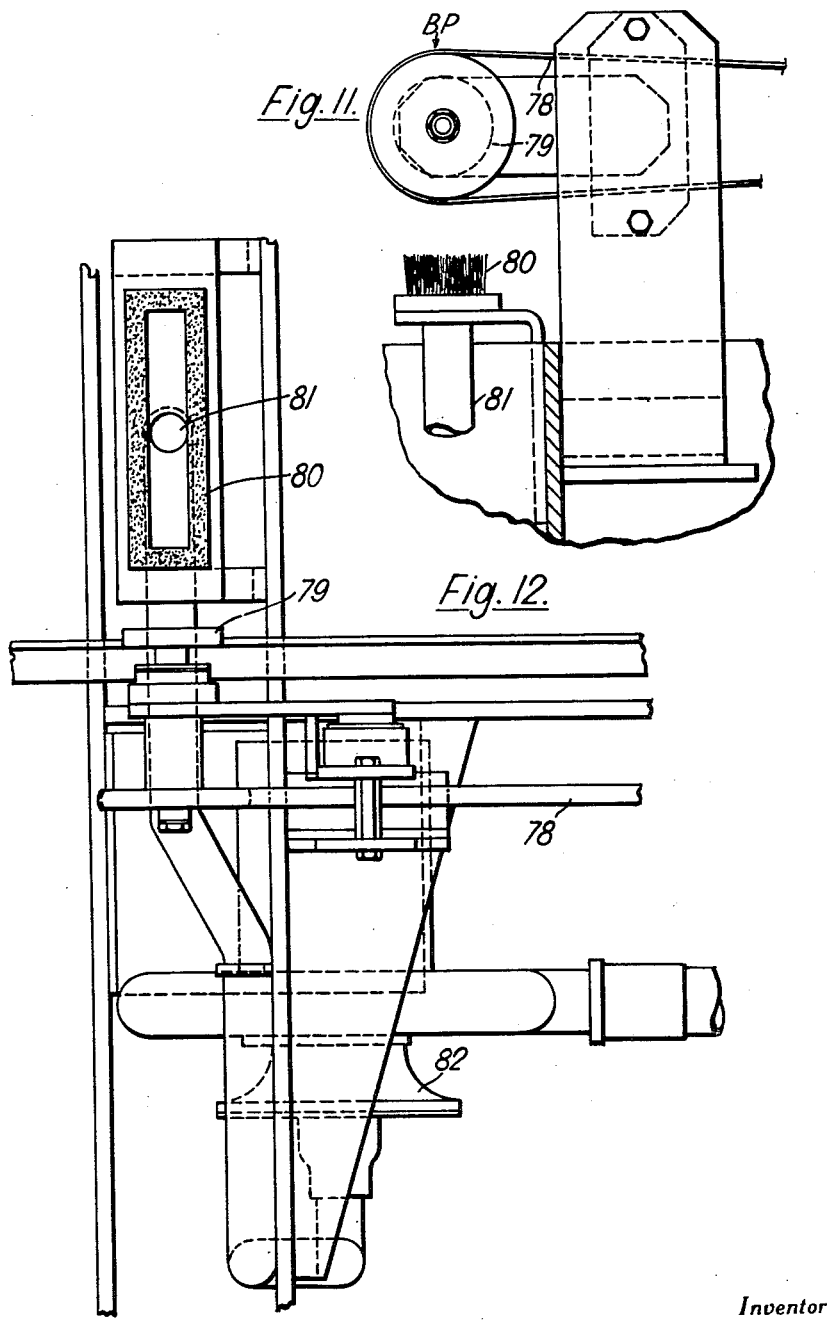

Dec. 3, 1963  H. COOKSON  3,112,692
DECORATING PLASTIC CONTAINERS
Filed May 2, 1961  14 Sheets-Sheet 8

Inventor
HAROLD COOKSON
By *Imirie & Smiley*
Attorneys

Dec. 3, 1963 H. COOKSON 3,112,692
DECORATING PLASTIC CONTAINERS
Filed May 2, 1961 14 Sheets-Sheet 10

Inventor
HAROLD COOKSON
By
Attorneys

Dec. 3, 1963    H. COOKSON    3,112,692
DECORATING PLASTIC CONTAINERS
Filed May 2, 1961    14 Sheets-Sheet 11
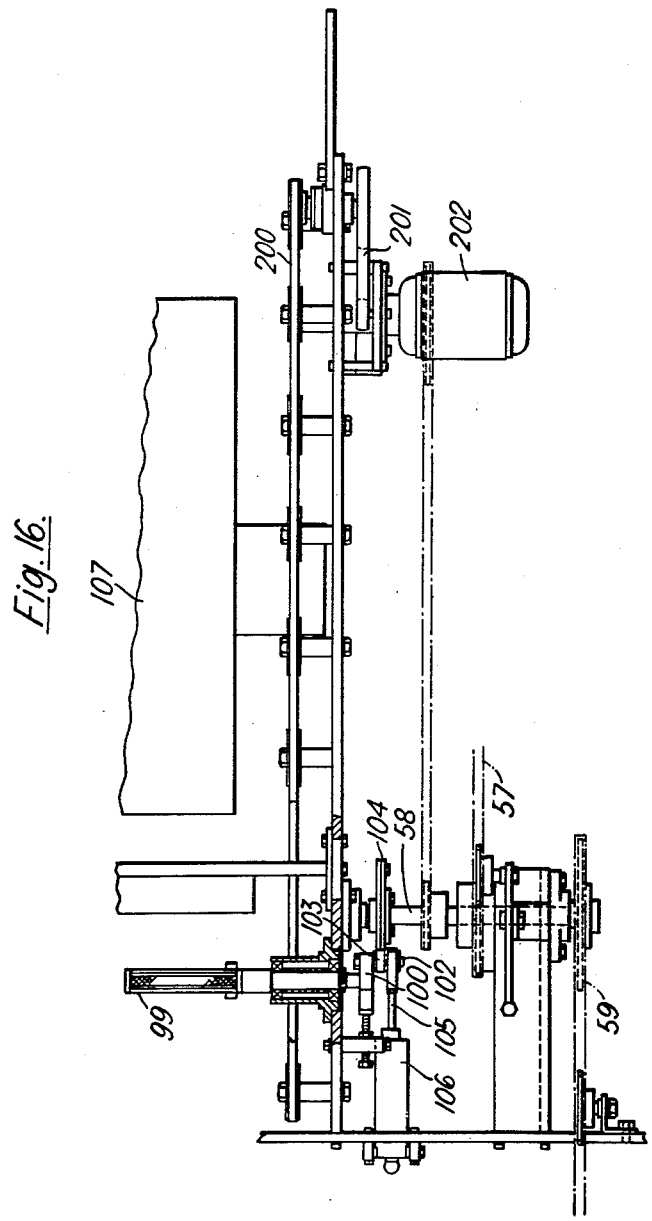
Inventor
HAROLD COOKSON
By *Tansier & Smiley*
Attorneys

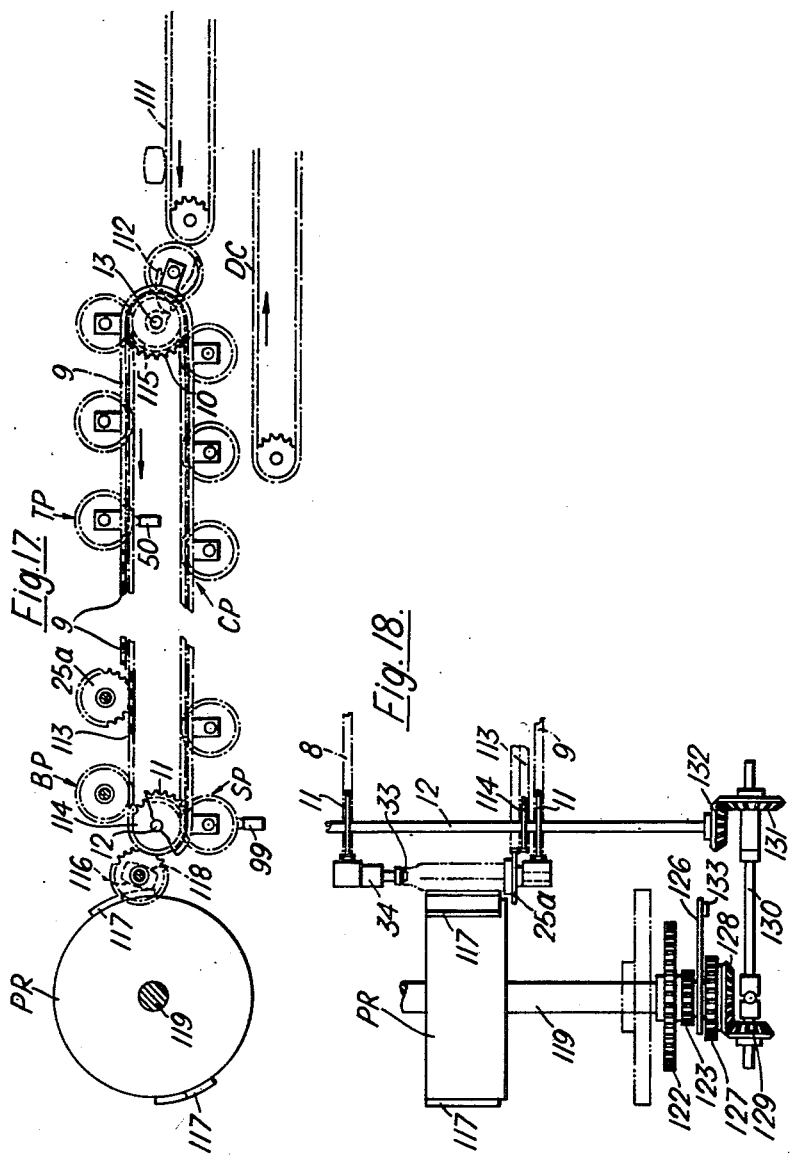

Dec. 3, 1963  H. COOKSON  3,112,692
DECORATING PLASTIC CONTAINERS
Filed May 2, 1961  14 Sheets-Sheet 13

Inventor
HAROLD COOKSON
By Imirie & Smiley
Attorneys

Inventor
HAROLD COOKSON

United States Patent Office 3,112,692
Patented Dec. 3, 1963

3,112,692
DECORATING PLASTIC CONTAINERS
Harold Cookson, Portsmouth, England, assignor to The Metal Box Company Limited, London, England, a British company
Filed May 2, 1961, Ser. No. 107,163
Claims priority, application Great Britain May 5, 1960
22 Claims. (Cl. 101—38)

This invention relates to decorating an exterior side of a plastic container, for example a bottle blow-moulded from material such as polyethylene, and in particular to the application of the decoration by the use of a printing device.

It has been proposed to effect exterior decoration of plastic containers such as bottles by applying the decoration to the bottle by the use of an offset printing device and it is known that the surface to be decorated must be heat-treated by subjection to a flame, usually a gas flame, in preparation for the application thereto of the decoration by the printing device. Heretofore it has been customary to effect the heat-treatment of the bottles, preparatory to printing thereon, at a position remote from the printing device and for the containers so treated to be moved by a conveyor to a position at which they are removed from the conveyor by a machine attendant who positions the bottles manually in a magazine from which the bottles are delivered one at a time to a chuck which engages a bottle at the opposite ends thereof while permitting rotation of the bottle about the axis of the bottle. The bottle is inflated by a pressurised gaseous medium before it is engaged by the blanket of an offset printing device and, following the application of the decoration to the bottle, the bottle is released from the chuck and is positioned on a conveyor by which it is removed from the vicinity of the decorating machine and is delivered to a position at which two attendants, sitting one on each of the opposite sides of the conveyor, remove the bottles from the conveyor and stand them upright on a further conveyor by which they are moved into and through a drying oven which dries the ink decoration applied to the bottles.

With this known process for decorating bottles it has not only been necessary to employ a number of attendants to effect the necessary handling of the bottles, but there has also been the possibility for the bottles to be rendered greasy by handling following the flame treatment, and this sometimes causes irregularities in the decoration. It is also not possible, just prior to printing thereon, to effect cleaning of the surfaces to be decorated in order to remove particles of dust or other minute foreign bodies which may be adhering thereto. It is found that, because it is not possible to effect cleaning of the surfaces to be decorated, the printing device has to be frequently stopped in order to permit cleaning of the printing blanket and this results in loss of operating time and consequent loss of output. Further, with the known forms of printing device, the chuck by which the bottle is held during printing thereon is located in a fixed position relative to the printing device so that it is necessary to effect inflation of the bottle at the same position as that which the bottle occupies during the printing operation. This also retards the rate of operation of the printing device and reduces output.

It is a main object of the present invention to provide a method of and apparatus for decorating an exterior side of a plastic container, which method and apparatus require a lesser number of manual operatives than have been hitherto required, avoid the handling of bottles between the flame-treating and printing stages, permit the cleaning of the surfaces to be decorated immediately prior to printing thereon, and further permit inflation of the container at a position in advance of that at which the container is decorated by the printing device.

According to the invention there is provided the method of decorating an exterior side of a plastic container by holding the container at the opposite ends thereof and while maintaining the hold on the container moving it to successive positions at which the exterior side portion to be decorated is respectively subjected to a flame treatment, is brushed to remove dust particles therefrom, and has decoration printed thereon.

Further according to the invention there is provided apparatus for decorating an exterior side of a plastic container, comprising an endless conveyor movable in one direction, holding devices carried by the conveyor and operable to hold a container at the opposite ends thereof while permitting rotation of the container about the axis thereof, treating means operable to direct on to a container held by said holding devices a flame arranged to prepare an exterior side of the container to receive the decoration, brush means engageable with the flame-treated surface of the container to remove dust particles therefrom, and a printing device operable to apply a decoration to the flame-treated and brushed surface of the container.

Figure 5:
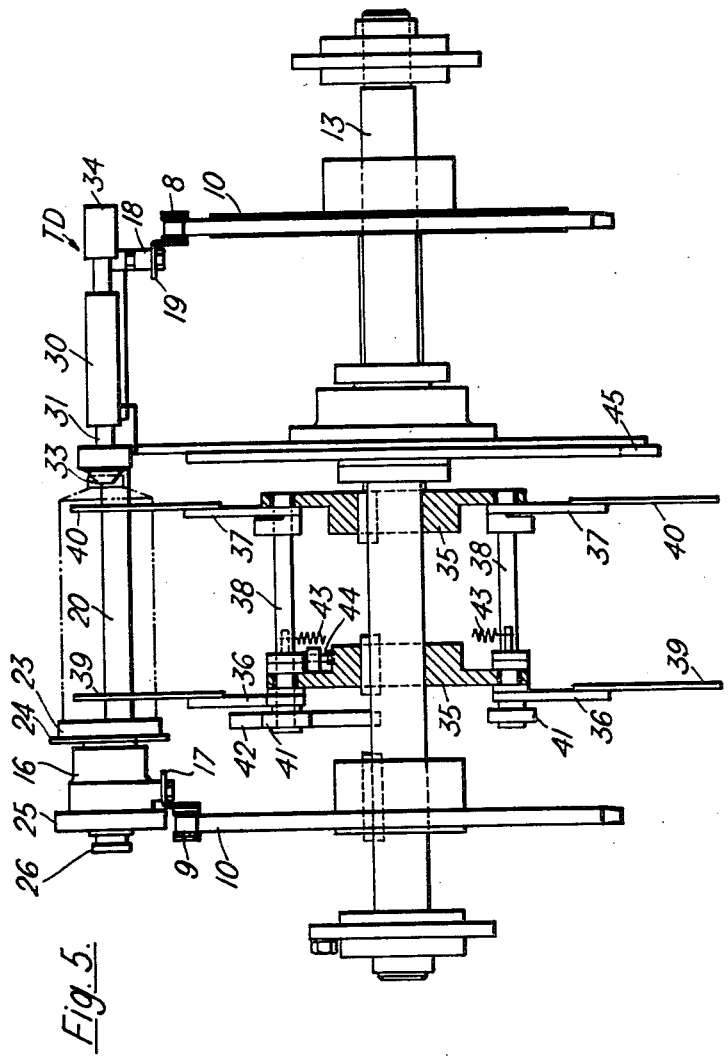
Figure 13:
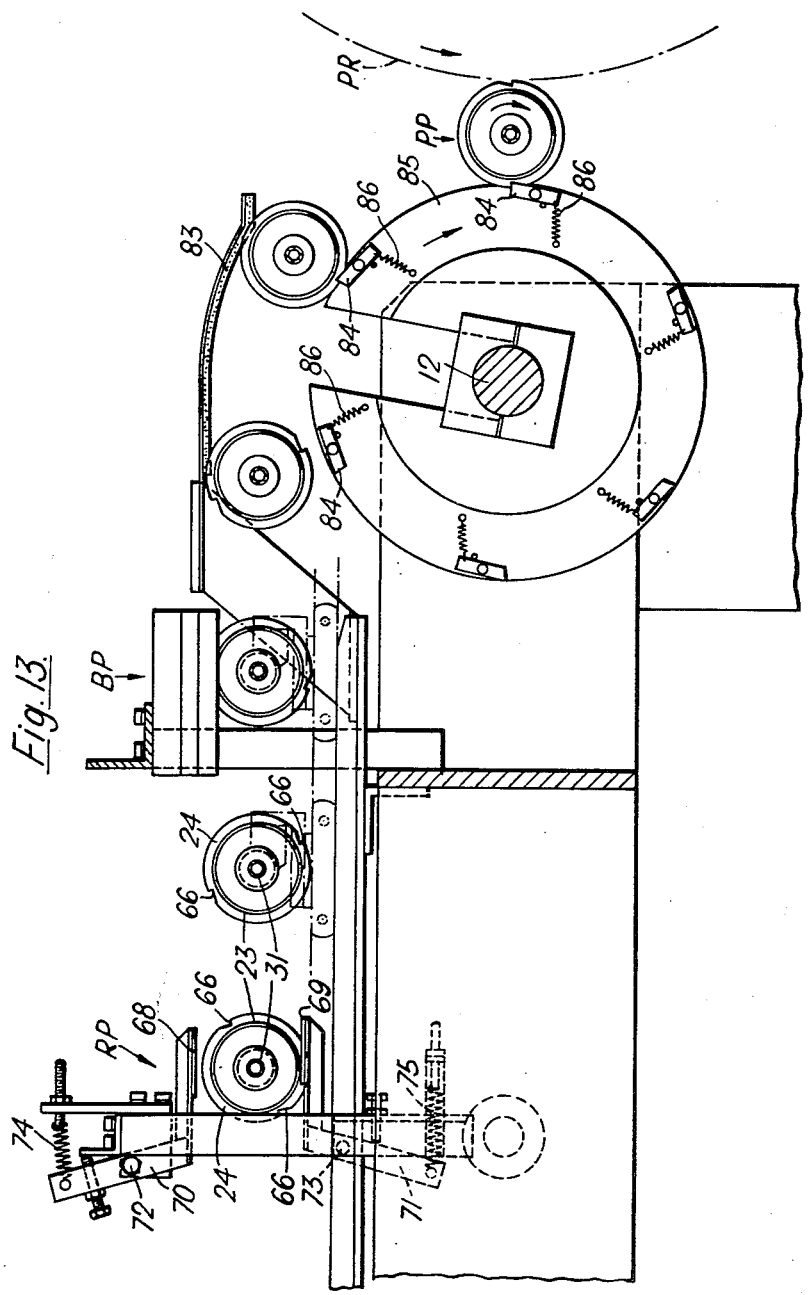
Figure 14:
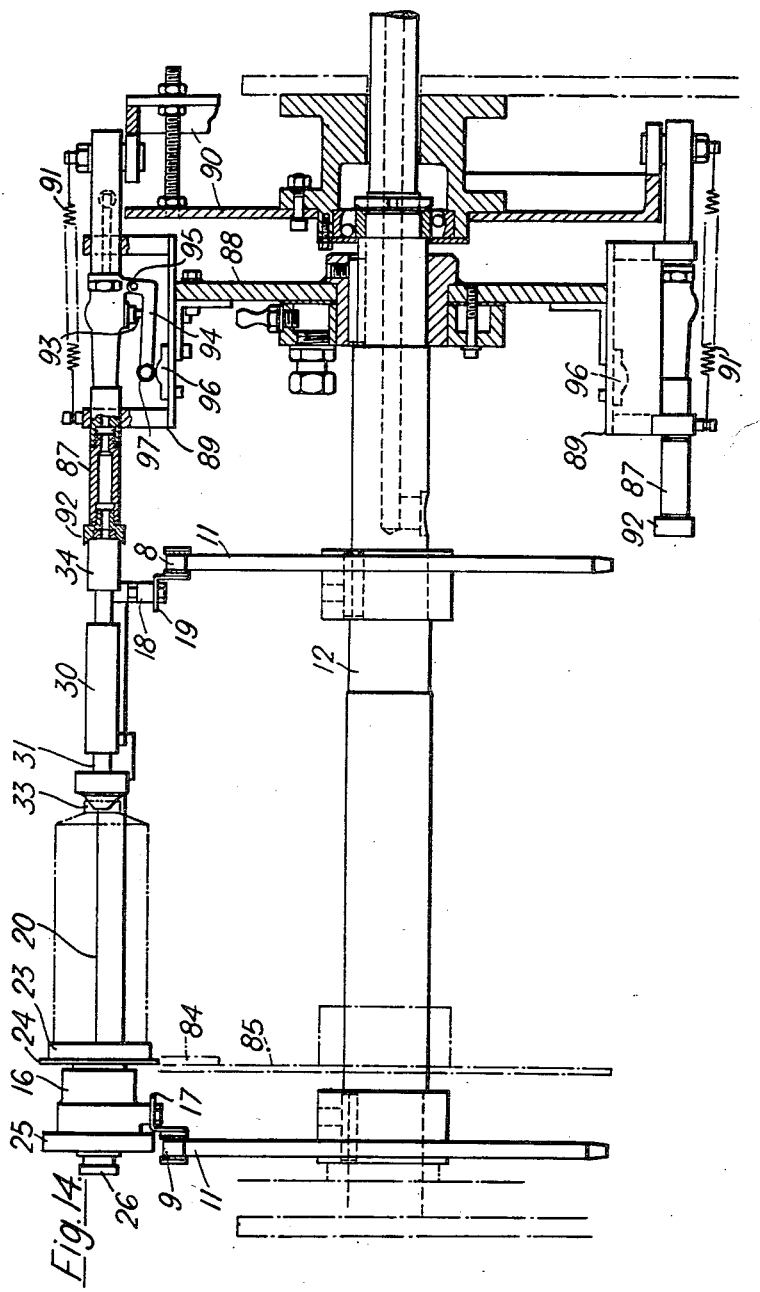
Figure 15:
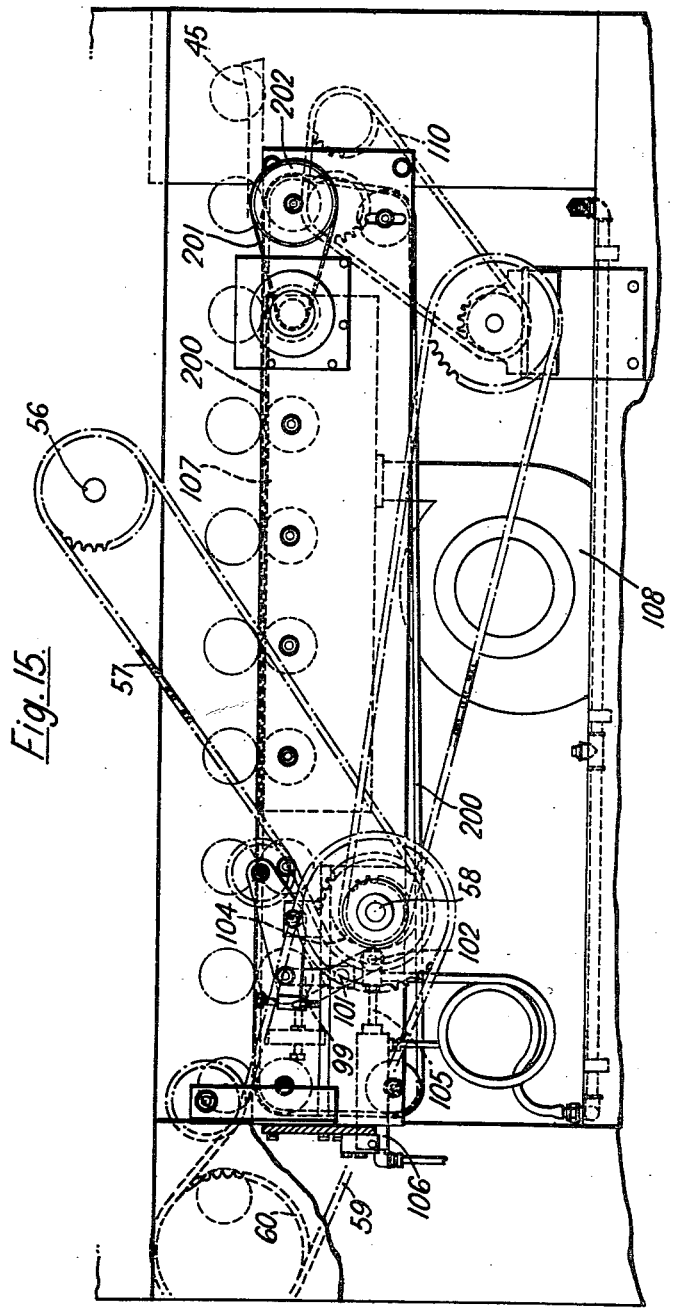
Figure 19:
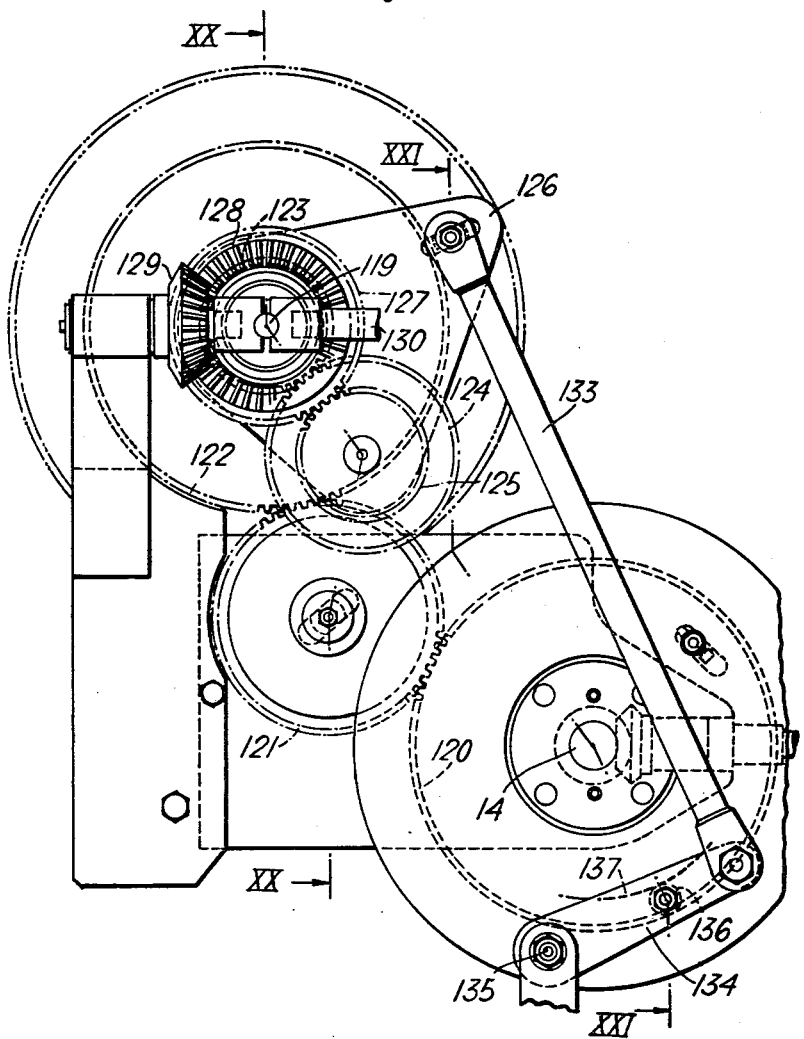
Figure 20:
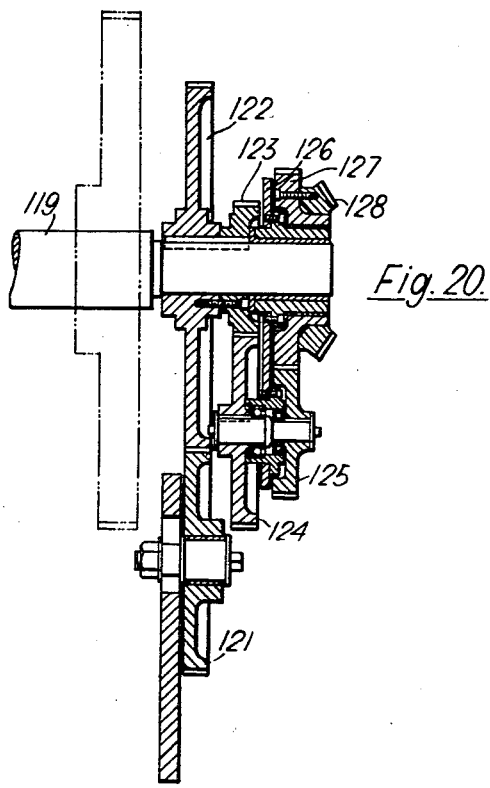
Figure 21:
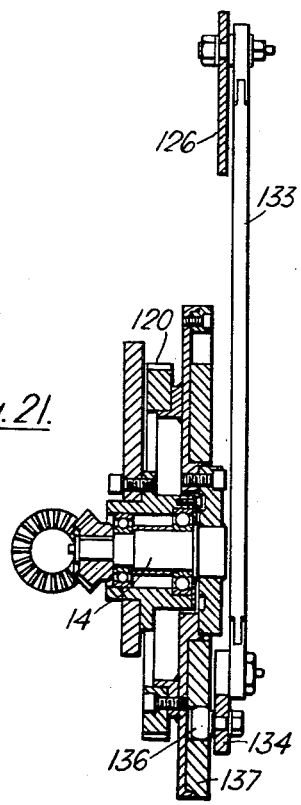

In order that the invention may be clearly understood, two embodiments thereof will now be described, by way of example, with reference to the accompanying drawings, in which:

FIG. 1 is a diagrammatic side elevation of apparatus according to the invention, FIG. 2 is a side elevation showing a gate at the delivery end of a magazine from which bottles are delivered to the apparatus, FIG. 3 is a top plan of FIG. 2, some parts being omitted for clarity, FIG. 4 is a side elevation of a part of bottle transporter means, FIG. 5 is a section on line V—V, FIG. 4, FIG. 6 is a top plan of a part of FIG. 5 and shows one bottle transporter device, FIG. 7 is a section on line VII—VII, FIG. 6, FIG. 8 is a side elevation of a bottle treating station, the conveyor and transporter means being omitted for clarity, FIG. 9 is a part section looking in the direction of arrow IX, FIG. 8, FIG. 10 is a top plan partly in section of a part of FIG. 8, FIG. 11 is an elevation of a brushing device embodied in the apparatus, FIG. 12 is a top plan of FIG. 11 with some parts omitted for clarity, FIG. 13 illustrates, partly in section, a bottle braking device and a bottle orienting device, FIG. 14 illustrates, partly in section, gas-filling means for inflating a bottle prior to printing thereon, FIG. 15 illustrates an ink curing position and a bottle cooling position, FIG. 16 is a top plan of a part of FIG. 15, FIG. 17 is a diagrammatic view illustrating apparatus for decorating bottles having two opposite substantially flat sides, FIG. 18 is a top plan of a part of FIG. 17, FIG. 19 illustrates driving mechanism for the apparatus shown in FIGS. 17 and 18, FIG. 20 is a section on line XX—XX, FIG. 19, and FIG. 21 is a section on line XXI—XXI, FIG. 19.

In the drawings like reference numerals refer to like or similar parts.

In the following description the containers to be decorated are considered to be bottles and will be hereafter referred to as bottles.

Referring to FIG. 1 of the drawings, bottles to be decorated are laid on their sides in a magazine M from which they are released one at a time for engagement by transporter devices TD movable in one direction by an endless conveyor. A bottle engaged by a transporter device is moved thereby in succession to a treating position TP, a bottle registering position RP, a brushing position BP, a printing position PP, an ink curing or stoving position SP, a cooling position CP, and a release position at which the bottle is released and is deposited on a delivery conveyor DC by which the printed bottles are delivered to any desired position such, for example, as to a boxing station at which the bottles are packed in boxes for storage and transport.

The bottles are retained in the magazine by a gate, shown as a rod 1, FIGS. 2 and 3, which is opened by the movement of a transporter device approaching the position at which a bottle is to be aligned therewith for engagement thereby. The rod 1 is carried by a plate 2 pivoted at 3 to a bracket 4 mounted on a part 5 of a side frame of the machine. Plate 2 is urged against a stop 6 by a spring 7.

The endless conveyor comprises two chains 8, 9, FIG. 5, passing round sprockets 10, 11, FIG. 1, the sprockets 10 being secured to a rotatable driving shaft 12 and sprockets 11 secured to a second rotatable shaft 13. Shaft 12 is rotated intermittently by a Geneva drive, not shown, which is driven from a motor driven shaft 14 and a transmission shaft 15 which is driven from shaft 14.

Referring to FIGS. 4 to 7, each bottle transporter device comprises a bearing 16 secured to a bracket 17 mounted on chain 9 and a bracket 18 which is secured to a further bracket 19 mounted on chain 8. Bearing 16 and bracket 18 are connected by a bar 20 of T-section. The bearing 16 houses ball-races 21, FIG. 7, rotatable with a hollow spindle 22. Also secured to spindle 22 for rotation therewith are bottle bottom-locating member 23, an indexing disc 24, a bottle-rotating wheel 25, and a gate-release member 26. An injector plate 27 is housed in member 23 and is carried by a spindle 28 movable axially in the hollow spindle 22 against the action of a spring 29.

Adjustably secured to the bar 20 is a housing 30 which supports a hollow spindle 31 for axial movement against the action of a spring 32 which is a stronger spring than is the spring 29. The inner end of spindle 31 carries a bottle neck-engaging member 33 of frusto-conical shape to enter the open end of the neck of a bottle. The outer end of the spindle 31 carries a mouthpiece 34 for co-operation with gas-filling means referred to below. The members 23 and 33 together with elements associated therewith form a chuck or bottle-holding device.

Also rotatable with the second shaft 13 are a pair of axially spaced discs 35, FIGS. 4 and 5, carrying a plurality of bottle supports which receive each bottle delivered from the magazine and support it until it is fully engaged and gripped between the members 23 and 33 of a chuck. Each bottle support comprises one bell-crank lever 36 and one straight lever 37 secured to a spindle 38 pivotally mounted in the discs 35, and secured to the levers 36, 37 are bottle-receiving elements 39, 40. Each bell-crank lever 36 carries a cam follower 41 arranged to engage a stationary cam 42 as described below. The levers 36, 37 are retained in the active positions thereof, FIG. 4, by springs 43, FIG. 5, which urge the levers 36 against adjustable stops 44 carried by one of the discs 35.

As the chains 8, 9 pass round the sprockets 11 the chucks are aligned with a pair of bottle-receiving elements 39, 40 and as the chuck approaches the magazine the bottle neck-engaging member 33 is engaged with a stationary cam 45, a part only of which is shown in FIG. 5, the rest being shown in FIG. 15, which moves the member 33 to the right, as viewed in FIG. 5, to release a finished bottle to fall on to the delivery conveyor DC.

The ejector plate 27 ensures that the bottle when released by member 33 is also released from member 23. The cam 45 retains the chuck open until after a bottle has been released from the magazine and received by the elements 39, 40 and the release of the bottle from the magazine is effected by the gate-release member 26 which engages the plate 2 and rocks it, counter-clockwise as viewed in FIG. 2, against the spring 7 so that the rod 1 is disengaged from the leading bottle in the magazine. As the bottle is moved by the elements 39, 40 away from the magazine the rod 1 is restored to the active position thereof and the member 33 is disengaged from cam 45 so that the member 33 is moved by spring 32 into the neck of the bottle the bottom of which is thus pressed against member 23 which, because spring 29 is weaker than spring 33, is in turn pressed against disc 24. As the loaded chuck commences its movement along the upper run of the conveyor, to the right as viewed in FIG. 4, the follower 41 is engaged with cam 42 and the elements 39, 40 are moved counter-clockwise beneath the upper run of the conveyor.

At the treating position TP the exterior of the bottle is subjected to the action of gas flame arranged to prepare the exterior surface to receive the decoration. While the chuck is located by the conveyor at the treating position the bottle-rotating wheel 25 is engaged by a rubber-coated driving wheel 46, FIGS. 8 and 9, which by rotating the wheel 25 effects rotation of the bottle supported and held by the chuck. The driving wheel 46 is mounted on a spindle 47 which is rotated continuously by an electric motor 48, FIGS. 1 and 9, and a belt 49 driven by the motor.

The gas flame is applied to the rotating bottle by a burner 50 which is mounted on a rocking shaft 51 to which an actuating arm 52 is secured. The actuating arm is connected to a spindle 53 which carries a cam follower 54, FIG. 8, which during operation of the machine co-operates with a cam 55, FIG. 10, rotatable with a shaft 56 driven by a chain 57 from a shaft 58, FIG. 1, which in turn is driven by a chain 59 and a sprocket 60 rotated by a gear box 61 driven by the transmission shaft 15. While the bottle remains in the treating position the cam 55 retains the burner 50 in the upright position thereof but as the chuck is moved away from the treating position the cam 55 moves the burner 50 to the position indicated by the dot and dash line 62, FIG. 8. The spindle 53 is also connected to the piston rod 63 of an air cylinder 64 which during operation of the machine maintains the follower 54 engaged with cam 55. When, however, the machine is stopped the air supply to the cylinder 64 ceases and the rod 63 rocks the burner to the position indicated by the dot and dash line 65, FIG. 8, so that the gas flame cannot burn any stationary bottle. A shield 66, FIG. 8, shields bottles from the gas flame when the burner is in either of the positions 62, 65 thereof.

After leaving the treating position TP a bottle is conveyed to the registering postion at which, if necessary, the bottom-locating member 23 is rotated relative to the bottle until a pair of diametrically opposed pips P, FIG. 7, carried by the ejector 27 are caused to be located in a pair of diametrically opposed recesses formed in the bottom of the bottle. The pips P carried by the ejector 27 are aligned with a pair of notches 66, FIG. 13, formed in the periphery of the indexing disc 24.

At the registering position the wheel 25 is rotated by a further rubber-coated driving wheel 67, FIG. 1, while the bottle is engaged by brake elements 68, 69, FIG. 13, by which rotation of the bottle is arrested until the pips P carried by the ejector 27 are located in the recesses formed in the bottom of the bottle when the bottle is positively rotated by member 23. The brake elements 68, 69, FIG. 13, are carried by levers 70, 71 pivoted respectively at 72, 73 and urged by springs 74, 75 to the bottle engaging positions thereof. Rotation of wheel 67 is effected by a belt 76, FIG. 1, which is driven by a continuously operable electric motor 77. Motor 77 also drives a second belt 78 which effects rotation of a further rubber-coated driving roller 79 located at the brushing position BP.

When the bottle is located at the brushing position BP, FIGS. 1, 11 and 12, it is rotated by the driving roller 79 while being engaged by a brush 80 which removes from the surface of the bottle dust or other minute particles of foreign matter which may be adhering thereto. The brush comprises bristles which co-operate with a vacuum tube 81 so that particles removed from the bottle by the bristles are sucked away from the vicinity of the brush and are collected in any suitable receptacle. Suction is applied to the tube 81 by a suction fan or other suitable device 82, FIG. 1.

While the bottle is being moved from the brushing position BP to the printing position PP it is oriented to ensure that the desired portion thereof is presented for initial engagement by the printing roller PR.

Orientation of the bottle is effected by rotation thereof through engagement of the bottle-rotating wheel 25 with a stationary leather-lined member 83, FIGS. 1 and 13, to rotate the bottle until one of the notches 66 on the indexing disc 24 is engaged by a stop 84, FIG. 13, pivoted to a plate 85 rotatable with the shaft 12. A number of stops 84 are carried by the plate 85 and so that the stops are successively aligned with the chucks and the stops are urged to notch-engaging positions thereof by springs 86. As soon as a pawl 84 is engaged in a notch 66 rotation of the bottle is arrested so that the bottle is properly oriented for the commencement of printing thereon at the printing station as indicated in FIG. 13.

The printing roller PR forms part of any suitable known form of printing machine the construction and mode of operation of which is not described herein as this is unnecessary to the understanding of the invention. All that is necessary for present purposes is for it to be understood that during a printing operation the printing roller PR engages and rotates the bottle, clockwise as viewed in FIG. 13, so that the notch 66 is disengaged from the stop 84.

Before the bottle reaches the printing position it is, as is customary, inflated to enable it to withstand the pressure applied thereto by the printing roller. Inflation is effected by apparatus known per se but which will be briefly described with reference to FIG. 14. An injection nozzle 87 is aligned with each chuck mouthpiece 34 and is supported for rotation with a support plate 88 rotatable with shaft 12. The nozzle 87 is reciprocable axially in a carriage 89 mounted on plate 88 by a fixed cam 90 against the action of springs 91. The leading end of the nozzle is fitted with a member 92 which on axial movement of the nozzle, to the left as viewed in FIG. 14, makes airtight engagement with the chuck mouthpiece 34. A valve 93 is operated by a lever 94 pivoted at 95 to the nozzle, the lever being rocked about its pivot by a stationary cam 96 mounted on the carriage 89 and co-operating with a follower 97 carried by the lever 94. The valve is operated to cause inflation of the bottle, by admitting compressed air thereto, from a source not shown but connected to the nozzle, before the bottle reaches the printing position and the valve is not closed, unless there is no bottle held by the chuck, until after the bottle has passed the printing position and the nozzle is being retracted from co-operation with the mouthpiece 34.

The printing machine is driven from the shaft 14, FIG. 1, by a chain 98 so that operation of the conveyor 8, 9 is synchronised with that of the printing machine and as can be seen from FIG. 1, the printing device is arranged to engage the bottle while the conveyor portion which carries the chuck is located between the upper and lower runs of the conveyor.

Following the exhausting of the compressed air from the bottle the chuck conveys it along the lower run of the conveyor first to an ink drying and curing or stoving position SP and then through a cooling position CP.

Curing or stoving is effected by a gas flame from a burner 99 carried by a second actuating arm 100, FIGS. 15 and 16, is mounted on a rocking shaft 101 and is connected to a spindle 102 which carries a cam follower 103 which, during operation of the machine co-operates with a cam 104 rotatable with the shaft 58. The spindle 102 is also connected to the piston rod 105 of a second air cylinder 106 and the operation of the burner is the same as that described above with reference to the burner 50.

After curing or stoving the bottle is moved by the conveyor 8, 9 through a cooling chamber 107 where it is cooled by air blown into the chamber by a fan 108. During stoving and cooling the bottles are rotated by engagement of the wheels 25 with an endless belt 200 driven continuously by a further belt 201 and an electric motor 202.

The finished bottle is delivered on to the delivery conveyor DC as above described, this conveyor being driven by an electric motor, not shown, and belt 110, FIGS. 1 and 15.

In the foregoing description it has been assumed that the bottle is of circular cross-section but it will be understood that in some instances a bottle may have a cross-section other than circular, for example a bottle may be of substantially rectangular cross-section and have two opposite substantially flat sides, or it may be of substantially oval cross-section. When bottles of this character are to be decorated the decoration is effected by the method which includes the steps of flame-treating, brushing, printing, ink curing or stoving, and cooling, but orientation as described above is not necessary.

FIGS. 17 to 21 illustrate a modified form of machine for decorating bottles having two opposite substantially flat sides, decoration of the two sides being effected during two movements of a bottle past the printing position PP.

Referring to FIG. 17, bottles are delivered to the machine by a conveyor 111 and are received therefrom one at a time by gripper devices shown diagrammatically at 112. The gripper devices perform a function similar to that of the bottle-receiving elements 39, 40 described above in that they support a bottle until it is gripped between the members 23 and 33 of the chuck of a transporter device similar to that described above. The transporter device differs from that described above primarily in that the bottle-rotating wheel 25 is omitted and is replaced by a sprocket wheel 25a, FIG. 18, which meshes with a chain 113 passing round drive sprockets 114, 115 rotatable respectively with the shafts 12, 13. In this embodiment of the invention, however, as is described below, the shaft 12 is continuously rotated. As can be seen from FIG. 17, the sprockets 114, 115 are of lesser diameter than sprockets 10, 11. Chains 8, 9 and 113 are each of ¾ inch pitch and it will accordingly be understood that the linear speed of chains 8, 9 is different from that of chain 113. The sprocket wheels 25a which mesh with chain 113 have 20 teeth. As the result of the difference in the linear speeds of the chains 8, 9 and 113 the chucks are rotated by sprockets 25a and when during the first pass of a bottle along the upper run of the chains the bottle reaches the treating position TP the side 116, FIG. 17, of the bottle is treated by the flame from the burner 50 which may if desired be oscillatable so as to follow the path of the bottle which, as stated above is movable continuously by the conveyor. By the time the bottle reaches the brushing position BP the side 116 of the bottle is uppermost and is engaged by a vacuum brush, not shown, which may be a rotating brush or a stationary brush similar to the brush 80.

Following brushing thereof, the bottle is moved to the printing position at which it is decorated by ink applied thereto from one of two blankets mounted on blocks 117 carried by the printing roller PR and while the bottle is engaged by the printing blanket it is moved at the same linear speed as that of the blanket. This is effected by driving means described below. After decoration the bottle is moved by the conveyor to the stoving position SP at which the ink is cured by the flame from the burner 99 which may, if desired, be oscillatable to follow the path of the bottle, and the bottle is then moved by the conveyor through the cooling position CP.

The bottle, decorated on the side 116, FIG. 17, thereof, is now carried along the upper run of the conveyor for a second time during which the side 118, FIG. 17, thereof is treated at the treating position TP, is brushed at position BP, is decorated at position PP, stoved at position SP, and cooled at position CP. As the bottle approaches the end of the second movement thereof along the lower run of the conveyor, a cam, not shown, releases the bottle from the chuck so that the bottle falls on to the delivery conveyor DC.

Referring to FIGS. 19 to 21, the printing roller PR is rotatable with shaft 119 driven from shaft 14 by gear wheels 120, 121, 122 of which gear wheel 122 is fast on shaft 119. Also fast on shaft 119 is a gear wheel 123 which meshes with gear wheel 124 of a compound gear wheel 124, 125 carried by a plate 126 pivoted freely on shaft 119. Gear 125 meshes with a gear wheel 127 which is freely rotatable about the shaft 119 and which has a bevel gear 128 fixed thereto. A bevel gear 129 meshes with the bevel gear 128 and is rotatable with a stub shaft 130 to which is also secured a bevel gear 131, FIG. 18, which meshes with a bevel gear 132 secured to the driving shaft 12.

The plate 126 is connected by a connecting rod 133 to an arm 134 which is pivoted at 135 and carries a cam follower 136 co-operating with a cam 137 rotatable with the shaft 14. Cam 137 effects rocking of plate 126 during a printing operation, which is effected during about 24 degrees of the angular movement of the printing roller PR, and thus causes driving shaft 12 to rotate at the same angular velocity as that of shaft 119 so that the linear speed of the blanket is synchronised with that of the bottle during a printing operation.

It will be understood that when employing apparatus as just described with reference to FIGS. 17 to 21, the opposite sides of a bottle are conditioned for decoration and are decorated, cured and cooled during two consecutive cycles of the conveyor chains 8, 9.

I claim:

1. Apparatus for decorating an exterior side of a plastic container, comprising an endless conveyor movable in one direction past a container treating station, a brushing station, a printing station, and a stoving station, holding devices carried by the conveyor and operable to hold a container at the opposite ends thereof while permitting rotation of the container about the axis thereof, treating means located at the treating station and operable to direct on to a container held by one of said holding devices a flame arranged to prepare an exterior side of the container to receive the decoration, brush means located at the brushing station and engageable with the flame-treated surface of the container to remove dust particles therefrom, a printing device located at the printing station and operable to apply a decoration to the flame-treated and brushed surface of the container, and stoving means located at the stoving station and arranged to apply heat to the decoration applied to the container to effect a stoving of the decoration.

2. Apparatus for decorating an exterior side of a plastic container, comprising an endless conveyor movable in one direction past a container treating station, a brushing station, a printing station, and a stoving station, holding devices carried by the conveyor and operable to hold a container at the opposite ends thereof while permitting rotation of the container about the axis thereof, treating means located at the treating station and operable to direct on to a container held by one of said holding devices a flame arranged to prepare an exterior side of the container to receive the decoration, brush means located at the brushing station and engageable with the flame-treated surface of the container to remove dust particles therefrom, a printing device located at the printing station and operable to apply a decoration to the flame-treated and brushed surface of the container, and a flame-applying device located at the stoving station and operable to apply a flame to the decoration applied to the container to effect a stoving of the decoration.

3. Apparatus for decorating an exterior side of a plastic container, comprising an endless conveyor movable in one direction past a container treating station, a brushing station, a printing station, a stoving station, and a cooling station, holding devices carried by the conveyor and operable to hold a container at the opposite ends thereof while permitting rotation of the container about the axis thereof, treating means located at the treating station and operable to direct on to a container held by one of said holding devices a flame arranged to prepare an exterior side of the container to receive the decoration, brush means located at the brushing station and engageable with the flame-treated surface of the container to remove dust particles therefrom, a printing device located at the printing station and operable to apply a decoration to the flame-treated and brushed surface of the container, stoving means located at the stoving station and arranged to apply heat to the decoration applied to the container to effect a stoving of the decoration, and a cooling chamber located at the cooling station and including means to effect cooling of stoved containers.

4. Apparatus for decorating an exterior side of a plastic container, comprising an endless conveyor movable in one direction past a container treating station, a brushing station, a printing station, and a stoving station, holding devices carried by the conveyor and operable to hold a container at the opposite ends thereof while permitting rotation of the container about the axis thereof, treating means located at the treating station and operable to direct on to a container held by one of said holding devices a flame arranged to prepare an exterior side of the container to receive the decoration, brush means located at the brushing station and engageable with the flame-treated surface of the container to remove dust particles therefrom, driving means co-operating with the holding devices and operable to effect rotation of the container about the axis thereof while the container is subjected to the action of said treating means and brush means, a printing device located at the printing station and operable to apply a decoration to the flame-treated and brushed surface of the container, and stoving means located at the stoving station and arranged to apply heat to the decoration applied to the container to effect a stoving of the decoration.

5. Apparatus for decorating an exterior side of a plastic container, comprising an endless conveyor movable in one direction past a container treating station, a brushing station, a printing station, a stoving station, and a cooling station, holding devices carried by the conveyor and operable to hold a container at the opposite ends thereof while permitting rotation of the container about the axis thereof, treating means located at the treating station and operable to direct on to a container held by one of said holding devices a flame arranged to prepare an exterior side of the container to receive the decoration, brush means located at the brushing station and engageable with the flame treated surface of the container to remove dust particles therefrom, a printing device located at the printing station and operable to apply a decoration to the flame-treated and brushed surface of the container, stoving means located at the stoving station and arranged to apply heat to the decoration applied to the container to effect a stoving of the decoration, driving means co-operating with the holding means and operable to effect rotation of the container about the axis thereof while the container is subjected to the action of said treating means, brush means, and stoving means, and a cooling chamber located at the cooling station and including means to effect cooling of the stoved containers.

6. Apparatus for decorating an exterior side of a plastic container, comprising a pair of side-by-side endless conveyor chains passing round sprocket wheels rotatable in vertical planes, holding devices carried by the chains and operable to hold a container at the opposite ends thereof while permitting rotation of the container about the axis thereof, treating means and brush means spaced apart along the upper run of the conveyor chains and operable respectively to direct on to a container held by one of the holding devices a flame arranged to prepare an exterior side of the container to receive the decoration and to remove dust from the flame-treated surface of the container, a printing device operable to apply a decoration to the flame-treated and brushed surface of the container at a position between the upper and lower runs of the conveyor chains, and stoving means located adjacent the lower run of the conveyor chains and arranged to apply heat to the decoration applied to the container to effect a stoving of the decoration.

7. Apparatus according to claim 6 for decorating a container having two substantially flat opposite sides, including an endless container-turning chain movable at a lesser linear speed than that of the conveyor chains, a driving shaft common to the conveyor chains and the container-turning chain, a sprocket wheel rotatable with each said holding device and meshing with the container-turning chain to effect rotation of a container about the axis thereof during movement of the container by the conveyor chains, a rotatable printing device, and driving means coupling the printing device to said driving shaft in a manner such that the linear speed of the printing device and of a container are synchronised during a printing operation and printing on the opposite sides of the container is effected during two consecutive cycles of the conveyor chains.

8. Apparatus according to claim 7 including a cooling chamber including means to effect cooling of the stoved containers.

9. Apparatus for decorating an exterior side of a plastic container, comprising a pair of side-by-side endless conveyor chains passing round sprocket wheels rotatable in vertical planes, holding devices carried by the chains and operable to hold a container at the opposite ends thereof while permitting rotation of the container about the axis thereof, treating means and brush means spaced apart along the upper run of the conveyor chains and operable respectively to direct on to a container held by one of the holding devices a flame arranged to prepare an exterior side of the container to receive the decoration and to remove dust from the flame-treated surface of the container, a printing device operable to apply a decoration to the flame-treated and brushed surface of the container at a position between the upper and lower runs of the conveyor chains, stoving means located adjacent the lower run of the conveyor chains and arranged to apply heat to the decoration applied to the container to effect a stoving of the decoration, and a cooling chamber including means to effect cooling of the stoved containers.

10. Apparatus for decorating an exterior side of a plastic container, comprising a pair of side-by-side endless conveyor chains passing round sprocket wheels rotatable in vertical planes, holding devices carried by the chains and operable to hold a container at the opposite ends thereof while permitting rotation of the container about the axis thereof, treating means and brush means spaced apart along the upper run of the conveyor chains and operable respectively to direct on to a container held by one of the holding devices a flame arranged to prepare an exterior side of the container to receive the decoration and to remove dust from the flame-treated surface of the container, a printing device operable to apply a decoration to the flame-treated and brushed surface of the container at a position between the upper and lower runs of the conveyor chains, stoving means located adjacent the lower run of the conveyor chains and arranged to apply heat to the decoration applied to the container to effect a stoving of the decoration, driving means co-operating with the holding means and operable to effect rotation of the container about the axis thereof while the container is subjected to the action of said treating means, brush means, and stoving means, and a cooling chamber including means to effect cooling of the stoved containers.

11. Apparatus for decorating an exterior side of a plastic container, comprising an endless conveyor intermittently movable in one direction past a container treating station, a brushing station, a printing station, and a stoving station, holding devices carried by the conveyor and operable to hold a container at the opposite ends thereof while permitting rotation of the container about the axis thereof, a container-rotating wheel rotatable with each holding device, a first rocking gas burner located at the treating station to direct a flame on to an exterior side of a container held by one of the holding devices to prepare an exterior side of the container to receive the decoration, brush means located at the brushing station and engageable with the flame-treated surface of the container to remove dust particles therefrom, a printing device located at the printing station and operable to apply decoration to the flame-treated and brushed surface of the container, a second rocking gas burner located at the stoving station and arranged to apply heat to the decoration applied to the container to effect stoving of the decoration, said conveyor being stationary while a container is subjected to the action of the first gas burner, the brush means, and the second gas burner, continuously rotatable driving wheels engageable with the container-rotating wheels to effect rotation thereof at the treating station, the brushing station, the printing station, and the stoving station, and actuating means co-operating with each said gas burner and operable in timed relation with the movements of the conveyor to effect rocking of the burners between active and inactive positions thereof so that the flame from a burner is directed on to a container only when the apparatus is in operation and the container is being rotated by a rotatable driving wheel.

12. Apparatus according to claim 11 wherein the actuating means includes an actuating arm rockable with each gas burner, and a cam co-operating with the actuating arm and rotatable in timed relation with the movements of the conveyor.

13. Apparatus according to claim 12, including an air cylinder provided with a piston rod connected to said actuating arm, said air cylinder maintaining co-operation between said arm and said cam during operation of the apparatus and on stopping of the apparatus being operable to disengage the arm from the cam and to effect rocking of the burner to a second inactive position thereof.

14. Apparatus according to claim 11, including a magazine for containers to be decorated, and a transfer device operable to remove containers one at a time from the magazine and to position them for engagement by said holding devices.

15. Apparatus according to claim 14, including a pivoted gate arranged to retain containers in the magazine, and a gate-release member movable with each holding device and operable to rock the gate about the pivot therefor as the holding device and a transfer device axially aligned therewith approach the position at which a container is received from the magazine by the transfer device.

16. Apparatus for decorating an exterior side of a plastic container, comprising a pair of side-by-side endless conveyor chains passing round sprocket wheels intermittently rotatable in vertical planes, holding devices carried by the chains and operable to hold a container at the opposite ends thereof while permitting rotation of the container about the axis thereof, a first rocking gas burner and brush means spaced apart along the upper run of the conveyor chains and operable respectively to direct a flame on to an exterior side of a container held by one of the holding devices to prepare an exterior side of the container to receive the decoration and to remove dust from the flame-treated surface of the container, a container-rotating wheel rotatable with each holding device, a printing device operable to apply decoration to the flame-treated and brushed surface of the container at a position between the upper and lower runs of the conveyor chains, a second rocking gas burner located adjacent the lower run of the conveyor chains and arranged to apply heat to the decoration applied to the container to effect stoving of the decoration, said conveyor chains being stationary while a container is subjected to the action of the first gas burner, the brush means, and the second gas burner, continuously rotatable driving wheels engageable with the container-rotating wheels to effect rotation thereof during treatment of a container by said first gas burner, said brush means, and said second gas burner, and actuating means operable in timed relation with the rotation of said sprocket wheels to effect rocking of the burners between active and inactive positions thereof so that the flame from a burner is directed on to a container only when the apparatus is in operation and the container is being rotated by a rotatable driving wheel.

17. Apparatus according to claim 16, wherein the actuating means includes an actuating arm rockable with each gas burner, and a cam co-operating with the actuating arm and rotatable in timed relation with the movements of the said conveyor chains.

18. Apparatus according to claim 17, including an air cylinder provided with a piston rod connected to said actuating arm, said air cylinder maintaining co-operation between said arm and said cam during operation of the apparatus and on stopping of the apparatus being operable to disengage the arm from the cam and to effect rocking of the burner to a second inactive position thereof.

19. Apparatus according to claim 16, including a magazine for containers to be decorated, and a transfer device operable to remove containers one at a time from the magazine and to position them for engagement by said holding devices.

20. Apparatus according to claim 19, including a pivoted gate arranged to retain containers in the magazine, and a gate-release member movable with each holding device and operable to rock the gate about the pivot therefor as the holding device and a transfer device axially aligned therewith approach the position at which a container is received from the magazine by the transfer device.

21. Apparatus according to claim 20, wherein the transfer device comprises a pair of axially spaced discs rotatable with conveyor sprockets adjacent to the magazine, a plurality of container supports pivoted to the discs for movement therewith and aligned in pairs to receive and support a container for engagement by a holding device, springs to urge the container supports to the container supporting positions thereof, and a cam to rock the supports out of engagement with a container following operation of a holding device to effect holding of the container.

22. Apparatus for decorating an exterior side of a plastic container, comprising a pair of side-by-side endless conveyor chains passing round sprocket wheels intermittently rotatable in vertical planes, holding devices carried by the chains and operable to hold a container at the opposite ends thereof while permitting rotation of the container about the axis thereof, a first rocking gas burner and brush means spaced apart along the upper run of the conveyor chains and operable respectively to direct a flame on to an exterior side of a container held by one of the holding devices to prepare an exterior side of the container to receive the decoration and to remove dust from the flame treated surface of the container, a container-rotating wheel rotatable with each holding device, a printing device operable to apply decoration to the flame-treated and brushed surface of the container at a position between the upper and lower runs of the conveyor chains, a second rocking gas burner located adjacent the lower run of the conveyor chains and arranged to apply heat to the decoration applied to the container to effect stoving of the decoration, said conveyor chains being stationary while a container is subjected to the action of the first gas burner, the brush means, and the second gas burner, continuously rotatable driving wheels engageable with the container-rotating wheels to effect rotation thereof during treatment of a container by said first gas burner, said brush means, and said second gas burner, actuating means operable in timed relation with the rotation of said sprocket wheels to effect rocking of the burners between active and inactive positions thereof so that the flame from a burner is directed on to a container only when the apparatus is in operation and the container is being rotated by a rotatable driving wheel, and a cooling chamber including means to effect cooling of the stoved containers.

References Cited in the file of this patent

UNITED STATES PATENTS

| | | |
|---|---|---|
| 1,947,748 | Van Wormer | Feb. 20, 1934 |
| 2,213,426 | Anderson et al. | Sept. 3, 1940 |
| 2,601,825 | Blakey | July 1, 1952 |
| 2,645,870 | Smith et al. | July 21, 1953 |
| 2,648,097 | Kritchever | Aug. 11, 1953 |
| 2,704,382 | Kreidl | Mar. 22, 1955 |
| 2,718,847 | Jackson et al. | Sept. 27, 1955 |
| 2,751,701 | Grupe | June 26, 1956 |
| 2,796,164 | Hakogi | June 18, 1957 |
| 2,802,412 | Lecluyse et al. | Aug. 13, 1957 |
| 2,832,977 | Waikup et al. | May 7, 1958 |